US009118354B2

(12) United States Patent
Kole et al.

(10) Patent No.: US 9,118,354 B2
(45) Date of Patent: Aug. 25, 2015

(54) ELECTRONIC DEVICE WITH SHARED NEAR FIELD COMMUNICATIONS ELEMENT

(75) Inventors: Jared M. Kole, San Jose, CA (US); Michael B. Wittenberg, Mountain View, CA (US); Sawyer I. Cohen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 557 days.

(21) Appl. No.: 13/221,642

(22) Filed: Aug. 30, 2011

(65) Prior Publication Data

US 2013/0052947 A1 Feb. 28, 2013

(51) Int. Cl.
*H04B 5/00* (2006.01)
*H04M 1/725* (2006.01)

(52) U.S. Cl.
CPC ............ *H04B 5/0031* (2013.01); *H04B 5/0081* (2013.01); *H04M 1/7253* (2013.01); *H04M 1/72591* (2013.01); *H04M 2250/04* (2013.01)

(58) Field of Classification Search
CPC ... H04M 1/03; H04M 1/2474; H04M 1/6041; H04M 1/2475; H04M 1/72591; H04M 1/05; H04M 1/0258; H04R 25/554; H04R 1/10; H04R 1/1008; H04R 2420/07; H04R 1/1091; H04R 2460/13; H04R 29/00; H04B 5/0006; H04B 5/0075; H04B 1/38; G02C 11/06; H04W 4/003
USPC .................................. 455/41.1, 93, 120–123
See application file for complete search history.

(56) References Cited

U.S. PATENT DOCUMENTS

| 6,526,263 | B1* | 2/2003 | Saito ............................... 455/78 |
| 8,018,344 | B2* | 9/2011 | Chang et al. ................ 340/572.1 |
| 2006/0052055 | A1* | 3/2006 | Rowse et al. ................. 455/41.1 |
| 2011/0065385 | A1* | 3/2011 | Geslin et al. ................. 455/41.1 |
| 2011/0169657 | A1 | 7/2011 | August et al. |
| 2012/0051570 | A1* | 3/2012 | Arche ........................... 381/315 |
| 2012/0140761 | A1* | 6/2012 | Aerts ............................ 370/345 |
| 2012/0178366 | A1* | 7/2012 | Levy et al. .................... 455/41.1 |
| 2012/0202423 | A1* | 8/2012 | Tiedemann et al. .......... 455/41.1 |
| 2013/0017786 | A1* | 1/2013 | Kvist et al. .................... 455/41.2 |

FOREIGN PATENT DOCUMENTS

EP          1220222 A          3/2002

* cited by examiner

*Primary Examiner* — Edward Urban
*Assistant Examiner* — Max Mathew
(74) *Attorney, Agent, or Firm* — Treyz Law Group; Jason Tsai; Joseph F. Guihan

(57) ABSTRACT

Electronic devices may be provided with near field communications capabilities. A near field communications antenna may be formed from multiple inductive components. The inductive components may include a speaker coil. One or more switches may be provided in the near field communications antenna to adjust the inductance of the near field communications antenna during different modes of operation. An audio circuit may be used to generate audio signals. A first transmitter may be used to transmit near field hearing aid signals through the near field communications antenna. A second transmitter may be used to transmit near field communications signals to external equipment such as near field communications point of sale equipment. Switching circuitry may be used to selectively couple the audio circuit, the first transmitter, and the second transmitter to the near field communications antenna.

18 Claims, 9 Drawing Sheets

| L | MODE |
|---|---|
| L1 | MODE 1 |
| L1+L2 | MODE 2 |
| L1+L2+L3 | MODE 3 |

FIG. 8

| L | MODE |
|---|---|
| L1 | MODE A + MODE B |
| L1+L2 | MODE C |

FIG. 9

ELECTRONIC DEVICE WITH SHARED NEAR FIELD COMMUNICATIONS ELEMENT

This relates generally to wireless communications circuitry, and more particularly, to electronic devices that have wireless communications circuitry for supporting near field wireless communications.

Electronic devices often have wireless communications circuitry. For example, cellular telephones contain antennas and radio-frequency transceiver circuitry that is used in transmitting and receiving cellular telephone signals over relatively large distances (sometimes referred to as the "far field")

Some electronic devices also have wireless circuitry that handles communications using "near field" electromagnetic coupling. In a near field wireless arrangement, wireless signals may be conveyed over a relatively short distance (e.g., a few centimeters or less). Near field wireless communications circuitry may be used for application such as wireless payments where it is desirable to limit the range of the wireless signal to enhance security.

Some hearing aids are provided with circuitry for receiving near field wireless signals. During operation, a hearing aid compatible (HAC) wireless devices may generate near field signals that are received by a nearby hearing aid. The use of HAC wireless devices may help hearing impaired users listen to audio content while temporarily bypassing the microphone in the hearing aid. This can be helpful in noisy environments in which background noise has the potential to overwhelm the audio content.

To ensure that a device can be used both by hearing impaired users and by a users who are not hearing impaired, electronic devices generally include speakers. As they produce sound, some speakers may emit near field electromagnetic signals that are detectable by hearing aids with circuitry for receiving near field wireless signals.

Wireless devices with small sizes are increasingly popular. To ensure that a wireless device has a compact size, it may be desirable to eliminate unnecessary components. Minimizing device size in this way can be challenging, particularly when attempting to accommodate user demand near field communications capabilities, speakers, and HAC functionality.

It would therefore be desirable to be able to provide wireless devices with improved near field communications capabilities.

SUMMARY

Electronic devices may be provided with near field communications capabilities. A near field communications element may serve as an antenna for transmitting near field communications signals to external equipment. The external equipment may include hearing aids with near field communications capabilities, point of sale equipment, security card readers, and other equipment that receives near field communications signals.

The near field communications element may be formed from multiple inductive components. The inductive components may include a speaker coil or a coil associated with other electromagnetic transducer structures. Inductive components such as inductors formed from loops of conductor on a dielectric substrate may also be used in the near field communications element.

One or more switches may be provided in the near field communications antenna to adjust the inductance of the near field communications antenna during different modes of operation. When a first inductance value is desired, the switches can bypass unneeded inductive components. When a second inductance value that is greater than the first inductance value, the switches can be configured to switch appropriate inductive components into use in the near field communications element.

An audio circuit may be used to generate audio signals. A first transmitter may be used to transmit near field hearing aid signals through the near field communications element. A second transmitter may be used to transmit near field communications signals to external equipment such as near field communications point of sale equipment. Switching circuitry may be used to selectively couple the audio circuit, the first transmitter, and the second transmitter to the near field communications element.

Further features of the invention, its nature and various advantages will be more apparent from the accompanying drawings and the following detailed description of the preferred embodiments.

BRIEF DESCRIPTION OF THE DRAWINGS

FIG. 8 is a table showing how the inductance of an adjustable near field communications element of the type shown in FIG. 6 may be adjusted to accommodate three modes of operation in accordance with an embodiment of the present invention.

FIG. 9 is a table showing how the inductance of an adjustable near field communications element of the type shown in FIG. 7 may be adjusted to accommodate two modes of operation in accordance with an embodiment of the present invention.

DETAILED DESCRIPTION

Electronic devices may be provided with wireless communications circuitry. The wireless communications circuitry may be used to support wireless communications in cellular telephone bands, wireless local area network bands, and other wireless communications bands. The wireless communications circuitry may also include wireless circuitry for communicating over short distances using near field electromagnetic coupling. Wireless communications using near field coupling are sometimes referred to as near field communications.

Near field communications (NFC) may be used to convey any suitable information. Examples of applications of near field communications include wireless payments, security devices such as wireless keys, wireless identification cards, etc. Near field electromagnetic coupling may also be used to convey information between a device and external equipment such as a hearing aid. When equipment uses near field electromagnetic signals to convey hearing aid audio signals, the equipment is sometimes said to provide hearing aid compatibility (HAC) functions.

Figure 1:
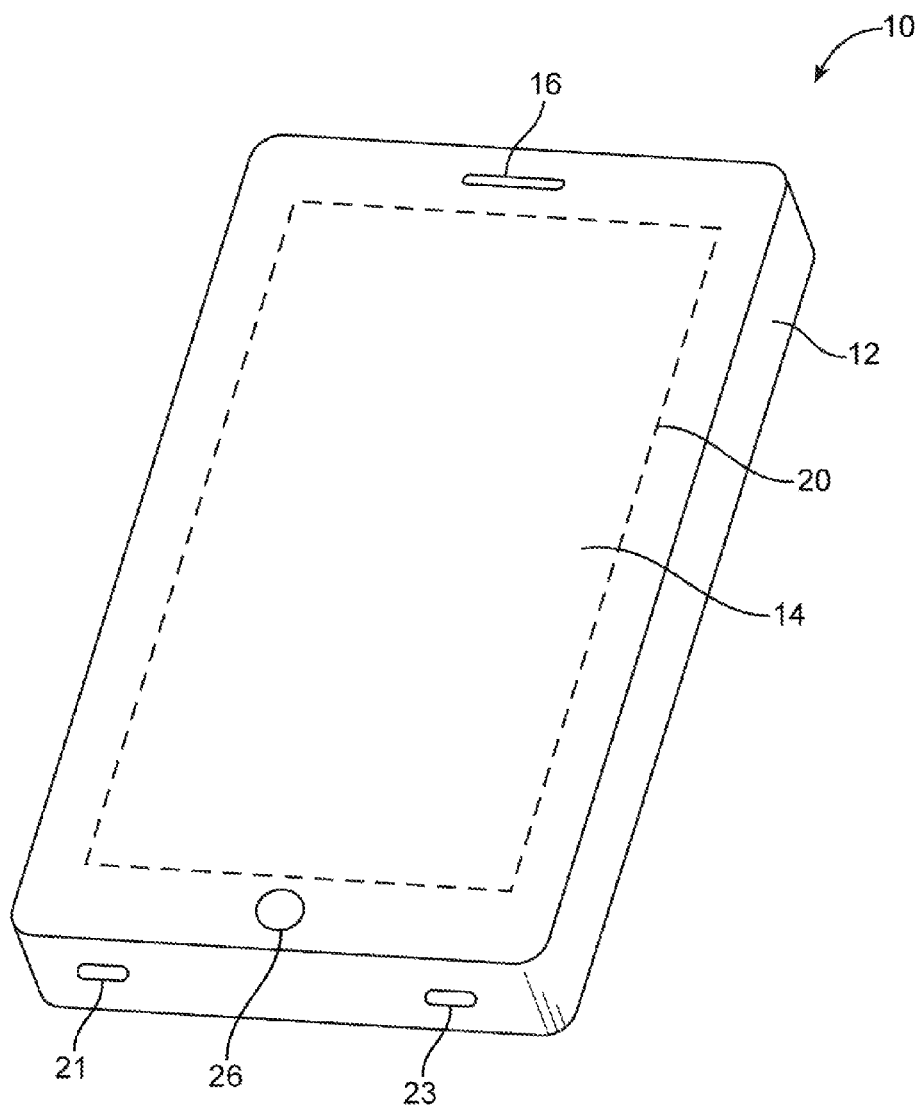
FIG. 1 is a perspective view of an illustrative electronic device of the type that may be provided with near field communications capabilities in accordance with an embodiment of the present invention.

A device such as device 10 of FIG. 1 may support one or more different types of near field communications schemes. In a typical scheme, signals that are to be transmitted may be generated using a transmitter circuit in device 10. An inductor or other near field communications element (sometimes referred to as a near field communications antenna or near field communications antenna structures) may be used to radiate (transmit) corresponding near field electromagnetic signals. These signals may be received by external equipment. For example, near field communications signals that are associated with a wireless payment transaction may be received by near field communications equipment in a point of sale terminal. Near field signals that are associated with hearing aid information may be received by a hearing aid (e.g., using an inductor in a hearing aid).

To accommodate multiple types of near field communications, multiple transmitters may be coupled to a shared inductor or other near field communications element. The shared near field communications element may, if desired, be adjusted during operation. In some modes of operation, for example, the inductor or other shared near field communications element may be adjusted to exhibit a given inductance value. In one or more other modes of operation, the inductor or other shared near field communications element may be adjusted to exhibit one or more additional inductance values. Tuning the shared near field communications element in this way may help reduce or eliminate the need for multiple independent near field communications elements in device 10.

Electronic device 10 of FIG. 1 may be a portable electronic device or other suitable electronic device. For example, electronic device 10 may be a laptop computer, a tablet computer, a somewhat smaller device such as a wristwatch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 within rectangular region 20 may correspond to the active part of display 14. In active display region 20, an array of image pixels may be used to display images for a user. Portions of display 14 such as peripheral regions surrounding rectangular active region 20 may be inactive and may be devoid of image pixel structures.

The cover glass layer that covers display 14 may have openings such as a circular opening for button 18 and a speaker port opening such as speaker port opening 16 (e.g., for an ear speaker for a user). Openings 16 and 18 may, for example, be formed in the inactive portion of display 14. Device 10 may also have other openings (e.g., openings in display 14 and/or housing 12 for accommodating volume buttons, ringer buttons, sleep buttons, and other buttons, openings for an audio jack, data port connectors, removable media slots, etc.). For example, the housing at the lower end of device 10 or other suitable portion of device 10 may have openings to form microphone port 21 and speaker port 23.

Antennas for far field and near field communications may be located may be located along the edges of device 10, on the rear or front of device 10, as extending elements or attachable structures, or elsewhere in device 10. Near field communications antennas (near field communications elements) may be formed using any type of structure that emits near field electromagnetic signals. Near field communications elements based on inductors are sometimes described herein as examples. This is merely illustrative. Any suitable conductive structures that emit sufficient near field radiation to couple with corresponding near field communications structures in external equipment may be used if desired.

Figure 2:
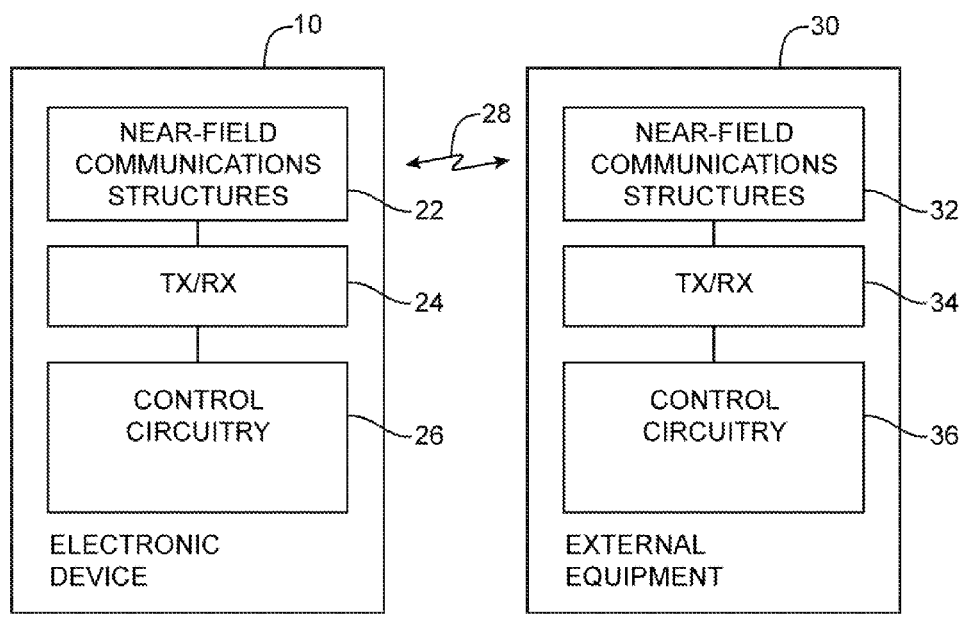
FIG. 2 is a schematic diagram of a system in which electronic equipment communicates using near field communications in accordance with an embodiment of the present invention.

FIG. 2 is a schematic diagram of a system environment in which near field electromagnetic coupling is used to communicate signals between device 10 and external equipment 30. Device 10 may be a cellular telephone, a tablet computer, a laptop computer, a wristwatch device or other miniature or wearable device, a handheld device or other portable device, or other suitable electronic equipment. External equipment 30 may be a hearing aid, a near field communications point of sale terminal for handling wireless payments, a near field communications reader associated with security equipment (e.g., a door opener, a badge reader, etc.), or other external equipment. In a typical system environment, device 10 may sometimes communicate with one type of near field communications equipment and may, at other times, communicate with one or more other types of near field communications equipment. For example, a user of device 10 may place device 10 near to a point of sale terminal when it is desired to make a wireless payment, may place device 10 near a door lock when it is desired to obtain access to a building, may place device 10 near a security card reader when it is desired to authenticate to a computer system, and may place device 10 near to a hearing aid when it is desired to communicate with the hearing aid using near field communications.

As shown in FIG. 2, electronic device 10 and external equipment 30 may include control circuitry 26 and 36. Control circuitry 26 and 36 may include microprocessors, microcontrollers, digital signal processors, application-specific integrated circuits, storage such as volatile and non-volatile memory (e.g., hard drives, solid state drives, random-access memory, etc.), and other storage and processing circuitry.

Device 10 and external equipment 30 may also include transceiver circuitry such as transceiver circuitry 24 and 34. Transceiver circuitry 24 and 34 may include one or more radio-frequency transmitters, one or more radio-frequency receivers, both transmitters and receivers, or other suitable communications circuitry for generating radio-frequency signals for near field communications. With one illustrative arrangement, device 10 includes a transmitter (i.e., transceiver 24 is a transmitter) and equipment 30 includes a corresponding receiver (i.e., transceiver 34 is a receiver). This type of arrangement may be used to support unidirectional near field communications between device 10 an external equipment 30. If desired, bidirectional near field communications may be supported. For example, transceiver 24 may include a transmitter and a receiver and transceiver circuitry 34 may include a transmitter and a receiver. Wireless near field communications signals 28 may, in general, be communicated from device 10 to equipment 30, from equipment 30 to device 10, or both from device 10 to equipment 30 and from equipment 30 to device 10.

Device 10 and equipment 30 may include near field communications elements 22 and 32. These structures, which are sometimes referred to as near field communications antennas may be formed form inductors or other structures (e.g., capacitors for capacitive coupling arrangements or networks of multiple components such as inductors and/or capacitors for forming tuned resonating circuits). The structures of near field communications elements 22 and 32 are capable of transmitting and/or receiving near-field-coupled radio-frequency electromagnetic fields. Examples in which near-field communications elements are formed from inductive components are sometimes described herein as an example.

Figure 3:
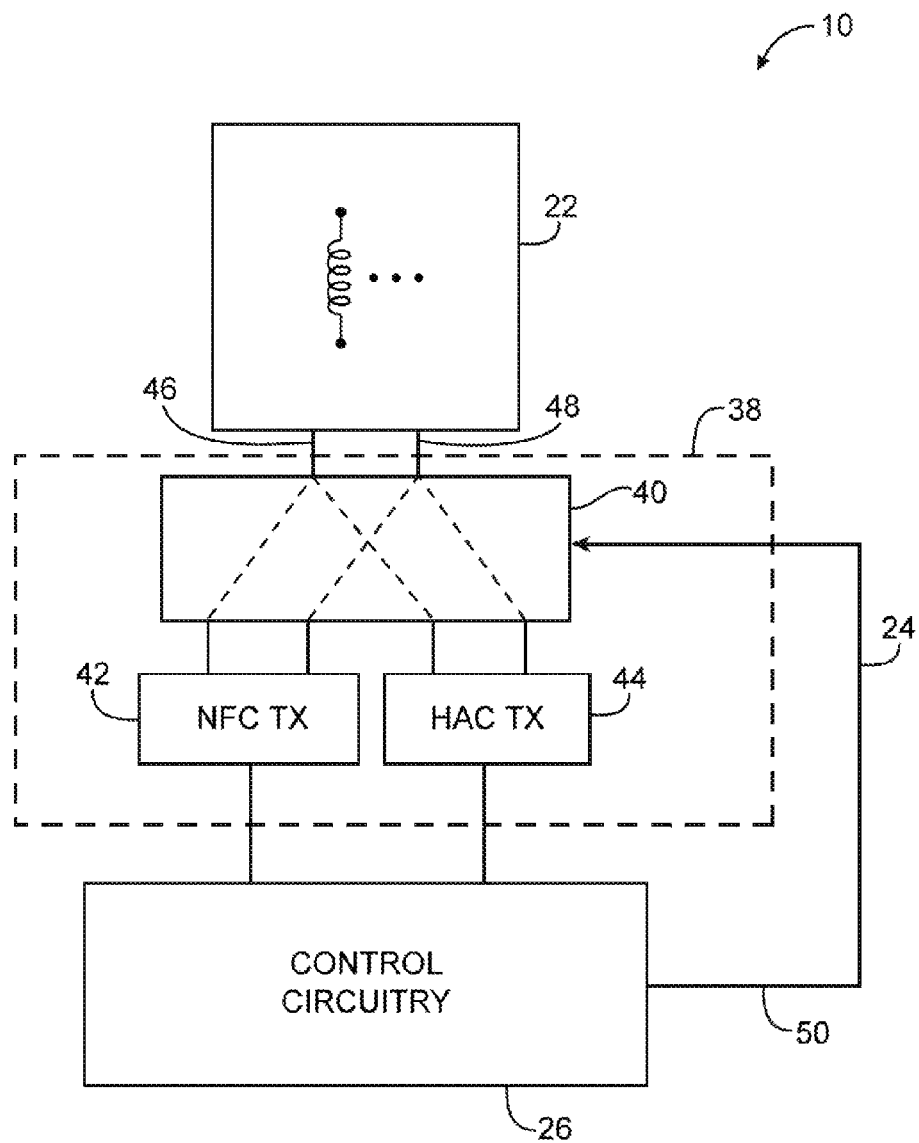
FIG. 3 is a diagram of illustrative wireless communications circuitry in which a first transmitter such as a near field communications transmitter and a second transmitter such as a transmitter used for communicating with a hearing aid are coupled to a shared near field communications element in a wireless electronic device in accordance with an embodiment of the present invention.

An illustrative configuration that may be used for device 10 is shown in FIG. 3. As shown in FIG. 3, device 10 may include a near field communications element such as element 22. Element 22 may be based on inductive structures (e.g., looped conductors that form one or more inductors). Terminal 46 may form a first terminal for element 22 and terminal 48 may form a second terminal for element 22.

Wireless transceiver circuitry 24 may include multiple transceiver circuits. As an example, wireless circuitry 24 may includes a first transceiver circuit such as NFC transmitter 42 and a second transceiver circuit such as HAC transmitter 44. Transmitter 42 may be used to transmit wireless payment information or other NFC data (e.g., non-hearing-aid information such as security card information, wireless lock information, payment information, etc.). Transmitter 44 may be used to transmit hearing aid signals (i.e., HAC audio signals). The audio signals that are transmitted by HAC transmitter 44 may contain audio for a voice telephone call, audio associated with playing back a media file such as a song, or other audio signals produced in connection with the operations of device 10. First transmitter 42 and second transmitter 44 may be used to support different types of near field signaling schemes. For example, transmitter 42 may be used to support a wireless payment protocol or a security protocol, whereas transmitter 44 may be used to support HAC audio communications. Circuits 42 and 44 may be implemented using one or more integrated circuits. For example, circuit 42, circuit 44, and one or more integrated circuits in control circuitry 26 may be implemented using separate integrated circuits. If desired, circuit 42 and circuit 44 (and, optionally one or more control circuits within control circuitry 26) may be implemented using a common integrated circuit.

Circuit 40 may be used to couple multiple transceiver circuits such as transmitter 42 and transmitter 44 to shared near field communications element 22. Circuit 40 may, for example, be a coupler that allows circuits 42 and 44 to operate simultaneously. Circuit 40 may also be implemented using switching circuitry that selectively couples either circuit 42 or circuit 44 to terminals 46 and 48. This type of arrangement, which is sometimes described herein as an example, allows control circuitry 26 to transmit near field signals through shared near field communications element 22 using either circuit 42 or circuit 44. Switching circuit configurations may also be used to selectively couple three or more transmitters to a near field communications element.

Path 50 may be used to convey one or more control signals between control circuitry 26 and switching circuitry 40. When it is desired to transmit NFC signals with NFC transmitter 42 (e.g., for a wireless payment), control circuitry 26 may provide control signals to switching circuitry 40 via control path 50 that direct switching circuitry 40 to operate in a first (NFC) mode. In the NFC mode, NFC transmitter 42 may be coupled to near field communications element 22 and may be used in conveying NFC signals (e.g., wireless payment data or other information) to external equipment (e.g., a wireless point of sale terminal, etc.). When it is desired to transmit HAC signals with HAC transmitter 42 (e.g., to convey audio to an associated hearing aid), control circuitry 26 may provide control signals to switching circuitry 40 that direct switching circuitry 40 to operate in a second (HAC) mode. After placing switching circuitry 40 in the HAC configuration, HAC transmitter 44 may be used to convey HAC near field signals to external equipment such as a hearing aid using near field communications element 22. Because a single near field communications element 22 is used (in this example), the hardware resources associated with supporting multiple types of near field communications may be minimized.

If desired, the properties of near field communications element 22 may be adjusted during operation of device 10. For example, near field communications element 22 may be placed in different configurations to accommodate different types of near field communications. Consider, as an example, a scenario in which device 10 supports two different near field communications modes (e.g., a NFC communications mode for making wireless payments and an HAC communications mode for transmitting hearing aid audio signals). In response to determining that NFC communications are to be conveyed over near field communications element 22, control circuitry 26 may place near field communications element 22 in a first configuration. In the first configuration, the near field communications element may, for example, exhibit a first set of electrical properties (e.g., a first inductance value). In response to determining that HAC communications are to be conveyed over near field communications element 22, control circuitry 26 may place near field communications element 22 in a second configuration. In the second configuration, the near field communications element may, for example, exhibit a second set of electrical properties that are different than the first set of electrical properties (e.g., a second inductance value that is different than the first inductance value). Adjusting the properties of near field communications element 22 in this way may help device 10 accommodate communications with different types of external equipment.

Figure 4:
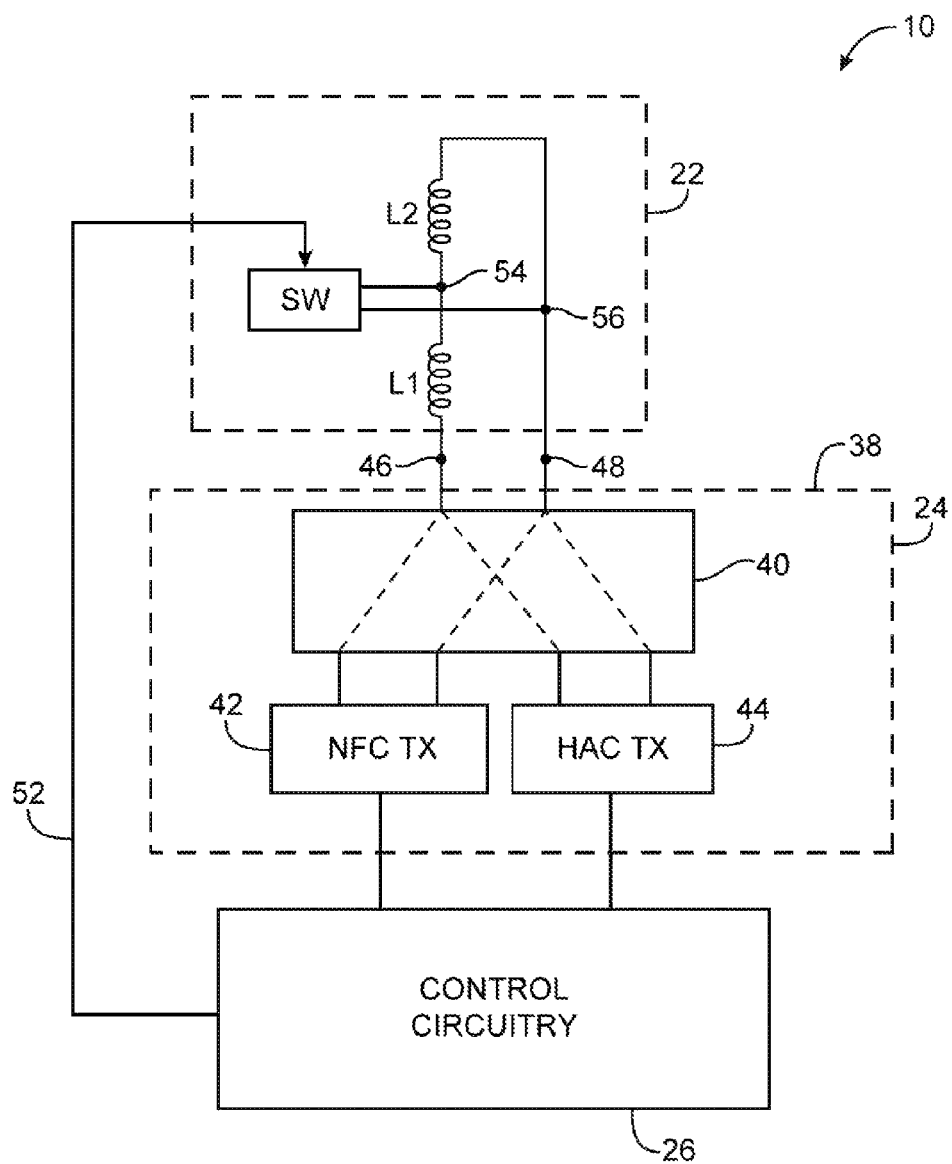
FIG. 4 is a diagram of illustrative wireless communications circuitry in which first and second transmitters share an adjustable near field communications element in accordance with an embodiment of the present invention.

An illustrative configuration that may be used for implementing an adjustable near field communications element in device 10 is shown in FIG. 4. In the example of FIG. 4, near field communications element 22 has been formed from multiple inductors. A first inductor may have an inductance of L1 and a second inductor may have an inductance value of L2. The first and second inductors (in this example) are interconnected using switching circuitry such as switch SW. The state of switch SW may be controlled by control signals from control circuitry 26 that are conveyed to switch SW via control path 52. In a first state, switch SW is open, so that terminals 54 and 56 are not electrically connected to each other through switch SW. In this first state, the inductance exhibited by near field communications element 22 across terminals 46 and 48 will be equal to the sum of inductance values L1 and L2 (i.e., the inductance of near field communications element 22 will be L1+L2 do to the series connection of inductors L1 and L2). In a second state, switch SW is closed, so that terminals 54 and 56 are electrically shorted to each other through switch SW. This configuration for the switching circuitry in adjustable near field communications element 22 bypasses inductive component L2. With inductor L2 bypassed, near field communications element 22 exhibits an inductance value of L1 across terminals 46 and 48.

As this example demonstrates, near field communications element 22 may be adjusted (tuned) between at least two different configurations. In the first configuration, element 22 may have a first inductance and in a second configuration element 22 may have a second inductance. Control circuitry 26 can place near field communications element 22 in an appropriate configuration depending on the type of near field communications that is desired. For example, when transmitter 42 is being used and transmitter 44 is inactive, control circuitry 26 can place near field communications element 22 in its first mode and when transmitter 44 is being used while transmitter 42 is inactive, control circuitry 26 can place near field communications element 22 in its second mode (as an example).

The conductive structures that make up near field communications element 22 may include wires, portions of a conductive housing structure associated with housing 12 of FIG. 1, patterned metal foil, conductive traces such as metal traces on a printed circuit or other dielectric substrate, or any other suitable conductive structures. In configurations in which near field communications element 22 includes inductive components, the conductive structures in near field communications element 22 may be formed from one or more loops (coils) of conductor. When coiled, the conductive lines in near field communications element 22 may form inductors such as inductors L1 and L2 of FIG. 4.

As an example, some or all of the conductive structures that are used in forming near field communications element 22 may be implemented using coils of metal traces on a dielectric substrate. If desired, some or all of the conductive structures in near field communications element 22 may be formed from coils of conductor (e.g., coiled wire) in a speaker. The speaker may be located in speaker port 16 or speaker port 23 of FIG. 1 (as examples). An advantage of forming near field communications element 22 from at least part of a speaker coil in a speaker associated with speaker port 16 is that near field communications signals that are emitted from the upper half of device 10 tend to couple well into a hearing aid when a user holds device 10 against the user's ear that contains the hearing aid.

Figure 5:
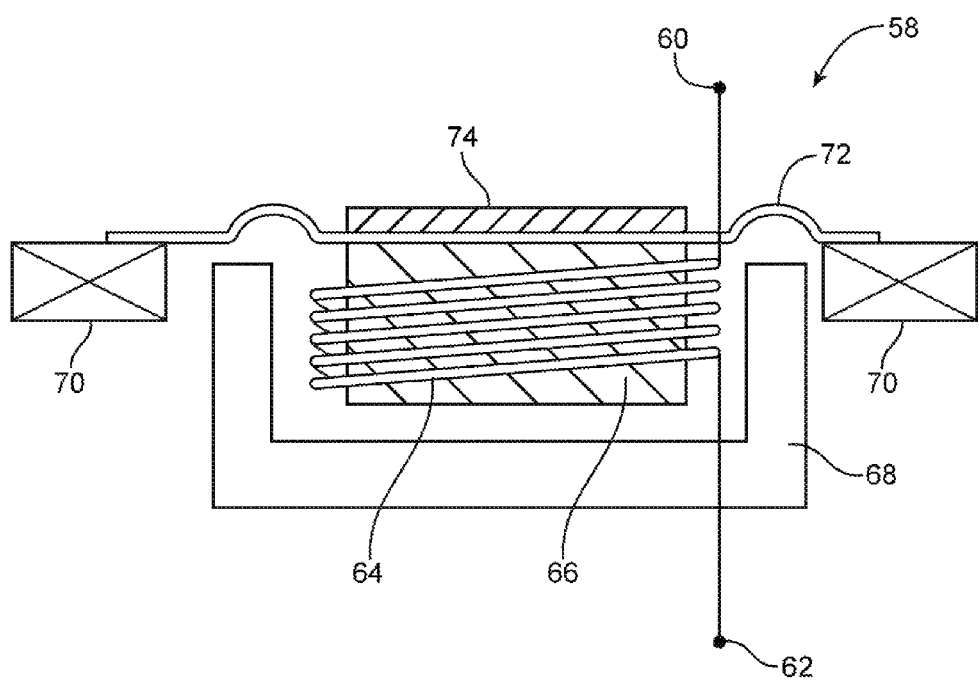
FIG. 5 is a cross-sectional side view of an illustrative speaker showing how a coil in the speaker may surround a moving magnet in accordance with an embodiment of the present invention.

A cross-sectional side view of an illustrative speaker of the type that may be used in speaker port 23 (a speakerphone port) or speaker port 16 (an ear speaker port) is shown in FIG. 5. As shown in FIG. 5, speaker 58 may have a moving magnet such as magnet 66. Magnet 66 and stationary coils 64 may be mounted within yolk (concentrator plate) 68. Plate 68 may be formed from a ferromagnetic material such as iron. Magnet 66 may be a permanent magnet and may be affixed to speaker diaphragm 72 and stiffener 74. The outer perimeter of diaphragm 72 may be supported by support structures 70. When audio signals are applied to coils 64 via terminals 60 and 62, magnetic fields are produced that cause magnet 66 and therefore the center of diaphragm 72 to move to create sound. The example of FIG. 5 shows a moving magnet arrangement, but, if desired, speakers may be formed using different arrangements (e.g., moving coil configurations, etc.). The arrangement of FIG. 5 is merely illustrative.

Some or all of the coils in a speaker such as coils 64 of speaker 58 in FIG. 5 may be used in forming near field communications element 22. For example, coils 64 of FIG. 5 may be used in forming inductor L1 of FIG. 4, inductor L2 of FIG. 4, or both inductors L1 and L2 of FIG. 4. If coils 64 of FIG. 5 are used to form both inductors L1 and L2, an electrical connection may be made at an intermediate location along the length of coils 64 to form a tap point for switch SW. In configurations in which coils 64 are used to form L1 or L2 the remaining inductor (L2 or L1) may be formed using another speaker coil, using loops of conductor on a printed circuit board or other substrate, using a discrete inductor having coils surrounding a ferromagnetic element, or other suitable inductor structures.

Figure 6:
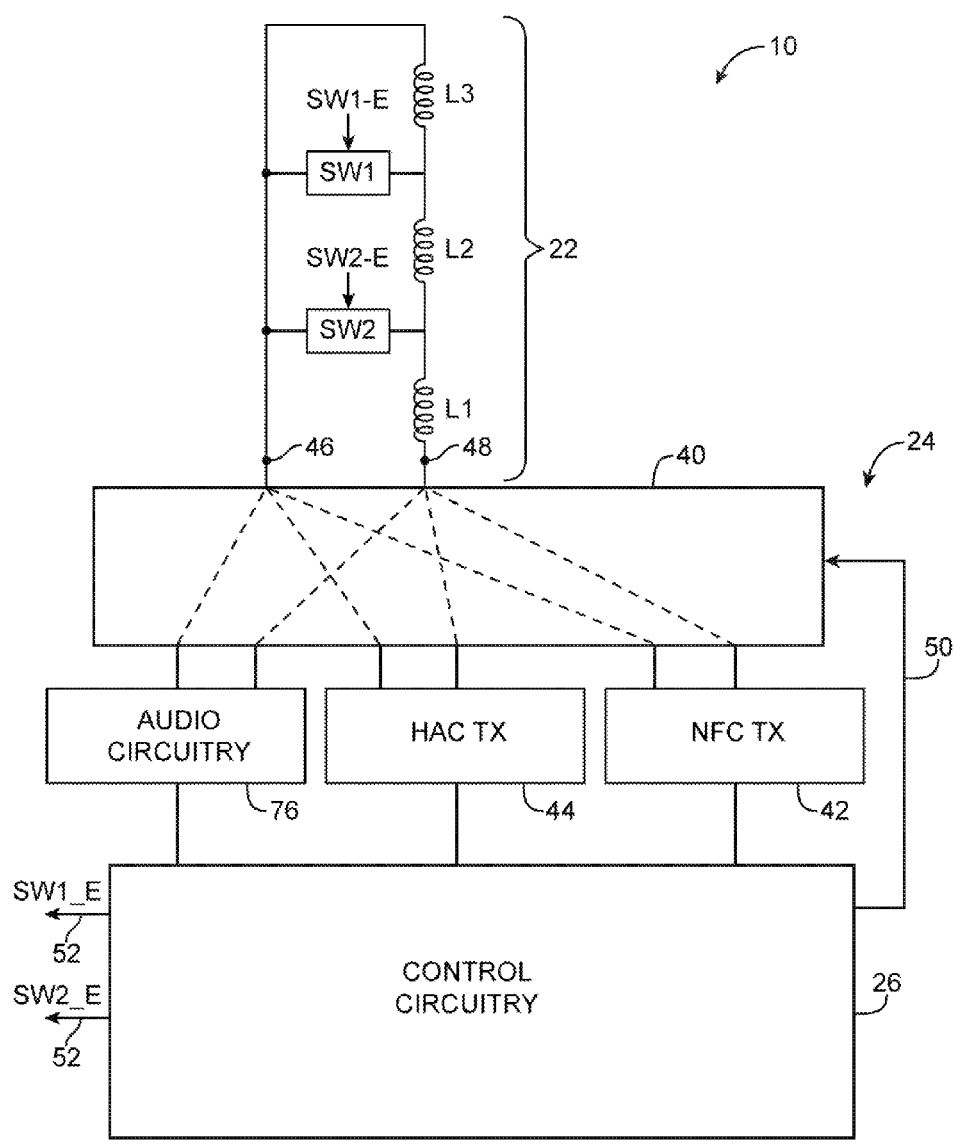
FIG. 6 is a diagram of wireless near field communications circuitry in which an adjustable near field communications element is formed from a circuit network with three inductors and two switches in accordance with an embodiment of the present invention.

FIG. 6 is a diagram that shows how an audio circuit may be coupled to near field communications element 22 in a configuration of the type in which at least a portion of near field communications element 22 is formed from a speaker coil inductor such as coils 64 of FIG. 5. As shown in FIG. 6, near field communications element 22 may have multiple inductive components such as inductors L1, L2, and L3. Switching circuitry such as switches SW1 and SW2 may be selectively configured by control circuitry 26 by issuing control commands SW1_E and SW2_E over control paths 52. When control circuitry 26 turns off switches SW1 and SW2, the inductance of near field communications element 22 will be equal to the sum of inductances L1, L2, and L3. Inductor L3 may be bypassed by turning on switch SW1 and turning off switch SW2 (i.e., by asserting switch enable signal SW1_E and deasserting switch enable signal SW2_E). When inductor L3 is bypassed in this way, the inductance of near field communications element 22 will be equal to the sum of inductances L1 and L2. In scenarios in which it is desired to bypass both inductors L2 and L3, switch SW2 may be turned on. When SW2 is turned on, the inductance of near field communications element 22 will be equal to L1.

Inductor L1 may be implemented using a speaker coil (inductor) such as coils 64 of FIG. 5. Inductors L2 and L3 may be implemented using speaker coils or other inductive components in device 10 (e.g., loops of conductor on a printed circuit board or other substrate that form a near field communications antenna, etc.).

When it is desired to play audio signals through the speaker for a non-hearing impaired user of device 10, control circuitry 26 can use switching circuitry 40 to couple audio circuitry 76 to the speaker (inductor L1). Switch SW2 may be turned on to bypass inductors L2 and L3.

The audio that is played back for the user when audio circuitry 76 is active may include noise cancellation signals that are obtained from a microphone on a headset that is attached to device 10. The localized noise associated with the noise cancellation signals will not be experienced by a user of a hearing aid when the hearing aid user is not using the headset. As a result, the user of the hearing aid might experience undesirable noise if the user of the hearing aid were to receiving a near field signal generated using audio circuitry 76 and inductor L1. This noise cancellation signal can be avoided by the user of the hearing aid by deactivating audio circuitry 76 and playing back the desired audio content (without a noise cancellation signal) for the user of the hearing aid using HAC transmitter 44 instead of audio circuitry 76 (as an example).

If desired, the inductance value of near field communications element 22 may be adjusted to optimize device 10 for HAC near field communications. As an example, switch SW2 could be turned off and switch SW1 could be turned on to adjust the inductance of near field communications element to L1+L2 during HAC transmissions. During use of HAC transmitter 44, control circuitry 26 can adjust switching circuitry 40 to couple HAC transmitter 44 to near field communications element 22.

When it is desired to use NFC transmitter 42 (e.g., for handling a wireless payment transaction), control circuitry 26 may adjust switching circuitry 40 so that NFC transmitter 42 is coupled to near field communications element 22. Control circuitry 26 may also adjust the inductance of near field communications element 22 to optimize element 22 for near field communications signals from NFC transmitter 42. For example, control circuitry 26 may turn off switches SW1 and SW2 so that the inductance exhibited by near field communications element 22 is equal to the sum of inductances L1, L2, and L3 (as an example).

Figure 7:
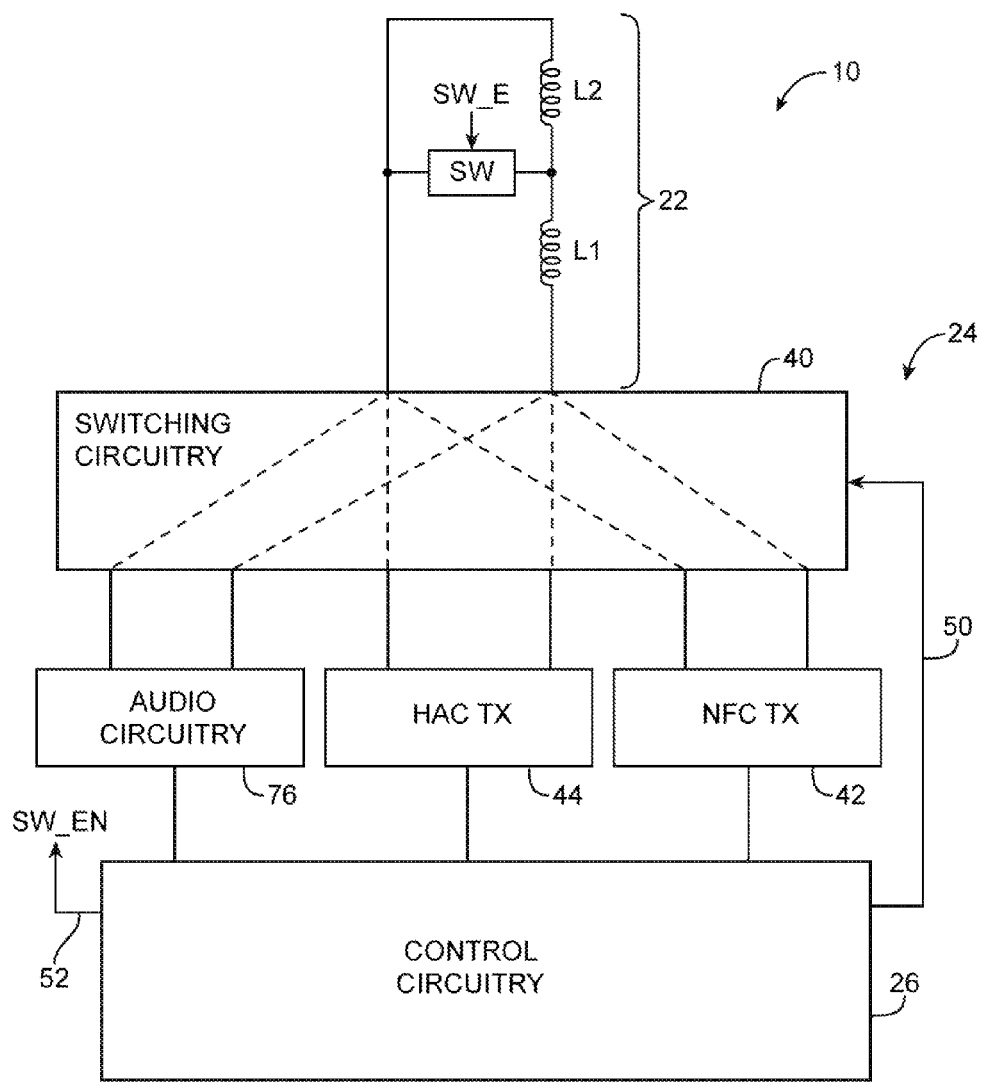
FIG. 7 is a diagram of wireless near field communications circuitry in which an audio circuit and two near field communications transmitter circuits are coupled to an adjustable near field communications element having two inductors an a switch in accordance with an embodiment of the present invention.
Figure 10:
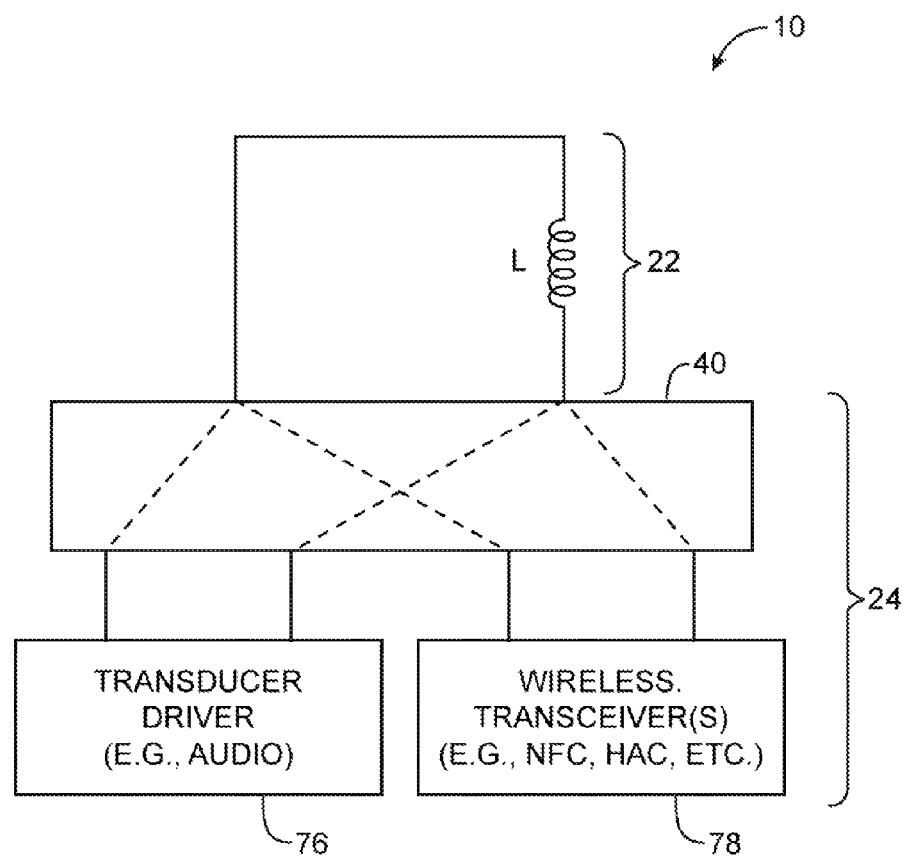
FIG. 10 is a diagram of illustrative near field communications circuitry in which a transducer driver such as an audio circuit or a circuit for controlling a vibrator or other actuator and one or more wireless transceiver circuits may be coupled to a near field communications element such as an inductor that forms part of a transducer in accordance with an embodiment of the present invention.

If desired, near field communications element 22 may be provided with fewer adjustable inductance values. As shown in FIG. 7, for example, near field communications element 22 may have a switch such as switch SW. Switch SW may be controlled by control signals SW_E that are provided to switch SW from control circuitry 26 using control path 52. Control circuitry 26 may place near field communications element 22 in a first mode having inductance L1 by closing switch SW to bypass inductor L2. When it is desired to increase the inductance of near field communications element 22 to L1+L2, switch SW may be placed in its open position.

Control circuitry 26 may use path 50 to supply control signals to switching circuitry 40. Switching circuitry 40 may be directed to couple audio circuitry 76 to element 22 when playing back audio (e.g., audio with noise cancellation) from audio circuitry 76 to a user who is not using a hearing aid. When a user of a hearing aid desires to listen to audio from device 10, control circuitry 26 may use switching circuitry 40 to couple HAC transmitter 44 to near field communication element 22. NFC transmitter 42 may be coupled to near field communications element 22 when it is desired to transmit NFC signals to external equipment (e.g., for NFC wireless payment transaction).

FIG. 8 is a table of illustrative inductance settings that may be used for near field communications element 22 in different modes of operation when using a device having circuitry of the type shown in FIG. 6. As shown in FIG. 8, the switching circuitry of near field communications element 22 may adjust the inductance of near field communications element 22 between a first value (L1), a second value (L1+L2), and a third value (L1+L2+L3). The first value may be used when audio circuit 76 is active (mode 1), the second value may be used when HAC transmitter 44 is active (mode 2), and the third value may be used when NFC transmitter 42 is active (as an example). Different types of operation may be associated with modes 1, 2, and 3 if desired. The example of FIG. 8 is merely illustrative.

FIG. 9 is a table of illustrative inductance settings that may be used for near field communications element 22 in different modes of operation when using a device having circuitry of the type shown in FIG. 7. As shown in FIG. 9, the switching circuitry of near field communications element 22 may adjust the inductance of near field communications element 22 between a first value (L1) and a second value (L1+L2). The first value may be used when audio circuit 76 is active while transmitters 42 and 44 are inactive (mode A) and may be used when HAC transmitter 44 is active while transmitter 42 and audio circuit 76 are inactive (mode B). When it is desired to use NFC transmitter 42, audio circuit 76 may be deactivated and HAC transmitter 44 may be deactivated while adjusting near field communications element 22 to exhibit an inductance value of L1+L2 (mode C). Different types of operation may be associated with modes A, B, and C if desired. The example of FIG. 9 is merely illustrative.

Inductive components for near field communications element 22 can be formed from components other than speakers. In general, the coils (inductive element) associated with any suitable transducer structures in device 10 may be used as part of near field communications element 22. Examples of components that include inductors (coils) that may be used as all or part of near field communications element 22 include vibrators (e.g., vibrators that create vibrations within device 10 to signal the presence of an incoming telephone call), motors, solenoids, other electromagnetic actuators, etc. These various different types of transducer may have an associated inductance value L when used in implementing all or part of near field communications element 22 (e.g., an adjustable or fixed near field communications element). Switching circuitry 40 may selectively couple element 22 to a transducer driver 76 (e.g., an audio circuit when the transducer is a speaker, a vibrator driver circuit when the transducer is a vibrator, etc.) or one or more near field communications transmitters (e.g., an NFC transmitter for wireless payments, a HAC transmitter for hearing aid signals, etc.).

The foregoing is merely illustrative of the principles of this invention and various modifications can be made by those skilled in the art without departing from the scope and spirit of the invention.

What is claimed is:

1. An electronic device, comprising:
   a near field communications element;
   a first radio-frequency transmitter configured to transmit first near field communications signals through the near field communications element;
   a second radio-frequency transmitter configured to transmit second near field communications signals through the near field communications element; and
   a circuit that couples the first and second radio-frequency transmitters to the near field communications element, wherein the first radio-frequency transmitter comprises a hearing aid compatibility transmitter configured to transmit the first near field communications signals to an external hearing aid, and wherein the circuit comprises switching circuitry for selectively coupling a selected one of the first and second radio-frequency transmitters to the near field communications element.

2. The electronic device defined in claim 1 wherein the second radio-frequency transmitter comprises a near field communications (NFC) transmitter configured to transmit the second near field communications signals to a point of sale terminal.

3. The electronic device defined in claim 2 wherein the near field communications element comprises an adjustable near field communications element.

4. The electronic device defined in claim 2 wherein the near field communications element comprises at least one speaker coil.

5. The electronic device defined in claim 1 wherein the near field communications element includes at least two inductive components and at least one switch for bypassing at least one of the inductive components.

6. The electronic device defined in claim 1 wherein the near field communications element includes at least one coil from a vibrator, wherein the vibrator is configured to create vibrations within the electronic device to signal the presence of an incoming telephone call.

7. The electronic device defined in claim 1 wherein the near field communications element includes a first inductor, a second inductor, and a third inductor and includes at least two switches.

8. The electronic device defined in claim 7 further comprising an audio circuit that produces audio signals, wherein the switching circuitry is configured to couple a selected one of the audio circuit, the first radio-frequency transmitter, and the second radio-frequency transmitter to the near field communications element.

9. The electronic device defined in claim 1 further comprising audio circuitry, wherein the switching circuitry is interposed between the audio circuitry, the first radio-frequency transmitter, and the second radio-frequency transmitter and the near field communications element.

10. The electronic device defined in claim 9 wherein the near field communications element includes a first inductor formed from a speaker coil.

11. The electronic device defined in claim 10 wherein the near field communications element includes a second inductor that is connected to the first inductor.

12. The electronic device defined in claim 11 further comprising control circuitry that generates control signals that direct the switching circuitry to couple a selected one of the audio circuitry, the first radio-frequency transmitter, and the second radio-frequency transmitter to the near field communications element.

13. The electronic device defined in claim 12 wherein the near field communications element includes a switch and wherein the control circuitry is configured to control the switch to bypass the second inductor.

14. An electronic device, comprising:
a near field communications antenna formed at least partly from a speaker coil;
a hearing aid compatibility transmitter that generates first radio-frequency signals that are transmitted to a hearing aid as near field electromagnetic signals through the near field communications antenna;
a near field communications transmitter that generates second radio-frequency signals that are transmitted to a point of sale terminal as near field electromagnetic signals through the near field communications antenna; and
switching circuitry with first and second configurations, wherein only the hearing aid compatibility transmitter transmits signals through the near field communications antenna in the first configuration, and wherein only the near field communications transmitter transmits signals through the near field communications antenna in the second configuration.

15. The electronic device defined in claim 14 wherein the near field communications antenna includes at least one switch having an open position in which the near field communications antenna has a first inductance and a closed position in which the near field communications antenna has a second inductance.

16. The electronic device defined in claim 15 further comprising:
an audio circuit that provides audio signals to the speaker coil, wherein the switching circuitry is configured to couple the audio circuit to the speaker coil and configured to couple the hearing aid compatibility transmitter and the near field communications transmitter to the near field communications antenna.

17. An electronic device, comprising:
a near field communications element formed from a speaker coil and an inductive structure and having a switch;
a first transmitter;
a second transmitter;
switching circuitry, wherein the switching circuitry is interposed between the first transmitter and the near field communications element, and wherein the switching circuitry is interposed between the second transmitter and the near field communications element; and
control circuitry that is configured to open and close the switch to adjust an inductance value associated with the near field communications element and that is configured to place the switching circuitry in at least a first configuration in which the first transmitter transmits near field radio-frequency signals to a hearing aid through the near field communications element and a second configuration in which the second transmitter transmits near field radio-frequency signals through the near field communications element to external near field communications equipment.

18. The electronic device defined in claim 17 wherein the control circuitry is configured to adjust the inductance value to a first value when the switching circuitry is in the first configuration and is configured to adjust the inductance value to a second value that is different than the first value when the switching circuitry is in the second configuration.

* * * * *